US012766746B2

(12) United States Patent
Russo et al.

(10) Patent No.: US 12,766,746 B2
(45) Date of Patent: Oct. 20, 2026

(54) CONTINUUM ROBOT

(71) Applicant: ROLLS-ROYCE plc, London (GB)

(72) Inventors: Matteo Russo, Nottingham (GB); Samuel P. Wild, Nottingham (GB); Xin Dong, Nottingham (GB); Dragos A. Axinte, Nottingham (GB); Andrew D. Norton, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/802,225

(22) Filed: Aug. 13, 2024

(65) Prior Publication Data

US 2025/0073930 A1 Mar. 6, 2025

(30) Foreign Application Priority Data

Aug. 31, 2023 (GB) ..................................... 2313269

(51) Int. Cl.
*B25J 18/06* (2006.01)
*B25J 9/10* (2006.01)

(52) U.S. Cl.
CPC ............... *B25J 18/06* (2013.01); *B25J 9/104* (2013.01)

(58) Field of Classification Search
CPC .... B25J 9/06; B25J 18/06; B25J 9/104; A61B 2034/301; A61B 1/0057
See application file for complete search history.

(56) References Cited

U.S. PATENT DOCUMENTS 3,266,059 A * 8/1966 Stelle .......................... B25J 9/06 138/131
3,430,662 A * 3/1969 Guarnaschelli ...... H02G 3/0475 138/120
3,497,083 A * 2/1970 Anderson .................. B25J 9/06 403/291
4,494,417 A * 1/1985 Larson ..................... B25J 18/06 446/368
5,727,391 A * 3/1998 Hayward .............. F03G 7/0635 60/528

(Continued)

OTHER PUBLICATIONS

Orekhov, A., Ahronovich, E., Simaan, N., Lie Group Formulation and Sensitivity Analysis for Shape Sensing of Variable Curvature Continuum Robots with General String Encoder Routing, , Dec. 23, 2022.

(Continued)

*Primary Examiner* — Zakaria Elahmadi

(57) ABSTRACT

A continuum arm robot segment that has a proximal end section and a distal end section. The continuum arm robot segment has at least one vertebra between the proximal end section and the distal end section, the vertebra being linked to the proximal end section and to the distal end section by linkages, wherein the proximal end section, the distal end section and the at least one vertebra are configured to have hollow cores to provide a passage within the continuum arm robot segment. The continuum arm robot segment also has at least two tendons that are connected to the distal end section and pass through the at least one vertebra and the proximal end section. The at least two tendons are routed helically so that they undergo substantially at least a 360° rotation between the proximal end section and the distal end section.

20 Claims, 7 Drawing Sheets

(56) References Cited

U.S. PATENT DOCUMENTS

| | | | | |
|---|---|---|---|---|
| 7,410,483 | B2 * | 8/2008 | Danitz | A61B 17/072 606/1 |
| 7,662,091 | B2 * | 2/2010 | Bagley | G02B 23/2492 600/149 |
| 8,182,418 | B2 * | 5/2012 | Durant | A61B 1/0055 600/141 |
| 10,111,722 | B2 * | 10/2018 | Poon | A61B 34/37 |
| 10,300,599 | B2 * | 5/2019 | Simaan | B25J 9/1625 |
| 10,779,803 | B2 * | 9/2020 | Prisco | A61B 10/04 |
| 11,109,925 | B2 | 9/2021 | Cooper et al. | |
| 11,607,238 | B2 * | 3/2023 | Kim | A61B 17/29 |
| 2006/0146127 | A1 * | 7/2006 | Bagley | G02B 23/2492 348/83 |
| 2008/0177282 | A1 * | 7/2008 | Lee | B25J 3/04 606/130 |
| 2009/0099420 | A1 * | 4/2009 | Woodley | F16C 1/106 600/142 |
| 2010/0298642 | A1 * | 11/2010 | Trusty | A61B 1/00135 600/114 |
| 2015/0343649 | A1 | 12/2015 | Galinson | |
| 2016/0151908 | A1 * | 6/2016 | Woodley | B25J 18/06 74/490.04 |
| 2019/0015978 | A1 * | 1/2019 | Takagi | B25J 9/065 |

OTHER PUBLICATIONS

European search report dated Jan. 14, 2025, issued in EP Patent Application No. 24191977.8.

Starke, J; Amanov, E.; Chikhaoui, T., On the merits of helical tendon routing in continuum robots, Sep. 24, 2017.

Great Britain search report dated Feb. 26, 2024, issued in GB Patent Application No. 2313269.9.

* cited by examiner

PRIOR ART

CONTINUUM ROBOT

CROSS-REFERENCE TO RELATED APPLICATIONS

This specification is based upon and claims the benefit of priority from United Kingdom patent application number GB 2313269.9 filed on Aug. 31, 2023, the entire contents of which is incorporated herein by reference.

BACKGROUND

Technical Field

The disclosure relates to the routing of cables through a continuum robot. In particular, the disclosure relates to a continuum arm robot segment with helical routing of tendons and a continuum arm robot that includes at least one such continuum arm robot segment.

Description of the Related Art

Flexible robotic arm systems such as continuum robots, borescopes, snake robots and endoscopes are used in a number of areas of industry from repair of complex equipment to performing medical operations. Flexible arm robots are used for their controllable flexibility, which allows them to safely access spaces that would be inaccessible without much more extensive work to the surrounding environment that is being accessed. Flexible robotic arms can be used for both inspection and repair processes, with the nature of the probe being determined by the tool or camera system that is used as the end effector on the robot. With these benefits the use cases for flexible robotic arms are set to increase.

Despite the number of applications for these robotic systems there are still issues with the use of flexible arm robots. Many of the issues are related to their advantage because the flexibility means that their positional control is not very accurate; this is because the continuum robot acts as a loaded cantilever beam and results in deflection from the desired position. This is deflection is further increased when a load is applied to the tip of the robot or to the end effector. As such, modelling the behaviour of the arm is difficult and extra sensors and equipment is required to track the position. Consequently, it is desired that the positional accuracy and control of the arms is improved.

SUMMARY

In a first aspect there is provided a continuum arm robot segment comprising: a proximal end section; a distal end section; at least one vertebra between the proximal end section and the distal end section, the vertebra being linked to the proximal end section and to the distal end section by linkages, wherein the proximal end section, the distal end section and the at least one vertebra are configured to have hollow cores to provide a passage within the continuum arm robot segment; and at least two tendons that are connected to the distal end section and pass through the at least one vertebra and the proximal end section; wherein the at least two tendons are routed helically so that they undergo substantially at least a 360° rotation between the proximal end section and the distal end section.

In some embodiments the tendons may be made from nitinol, steel, fibre or a plastics material.

In some embodiments there may be from 1 to 20 vertebrae between the proximal end section and the distal end section.

In some embodiments the segment may be provided with friction reducing elements at the points where the tendons pass through the at least one vertebra.

In some embodiments the proximal end section and the distal end section may be made from steel, titanium, aluminium, a metal alloy, or a plastics material.

In some embodiments the at least one vertebra may be made from steel, titanium, aluminium, a metal alloy, or a plastics material.

In some embodiments the angle of the tendons as they pass through the segment may be from 5 degrees to 90 degrees.

In some embodiments the angle of the tendons as they pass through the segment may be from 5 degrees to 90 degrees.

In a second aspect there is provided a continuum arm robot including at least one continuum arm robot segment, wherein the continuum arm robot segment comprises a proximal end section, a distal end section, between the proximal end section and the distal end section is at least one vertebra, the vertebra being linked to the proximal end section and to the distal end section by linkages, the proximal end section, the distal end section and the at least one vertebra are configured to have hollow cores to provide a passage within the continuum arm robot segment, at least two tendons are connected to the distal end section and pass through the at least one vertebra and the proximal end section, and wherein the at least two tendons are routed helically, so that they undergo substantially at least a 360° rotation between the proximal end section and the distal end section, and wherein each tendon is connected to an actuator to control the tension of the tendon or wherein a linked set of N segments are linked, so that the tendon in each segment has substantially 360°/N angular rotation.

In some embodiments the continuum arm robot may have a plurality of continuum arm robot segments each having a helical tendon routing according to the first aspect.

In some embodiments the continuum robot may have a plurality of continuum arm robot segments and wherein at least one of the continuum arm robot segments comprises a proximal end section, a distal end section, between the proximal end section and the distal end section is at least one vertebra, the vertebra being linked to the proximal end section and to the distal end section by linkages, the proximal end section, the distal end section and the vertebra are configured to have a hollow core, and at least two tendons are connected to the distal end section and pass through the at least one vertebra and the proximal end section, and wherein the at least two tendons are routed straight, so that there is no angular offset between where the tendons pass through the proximal end section, the distal end section and the at least one vertebra.

In some embodiments a proximal continuum arm robot segment within the continuum robot may be provided with an end effector.

In some embodiments a distal continuum arm robot segment of the continuum arm robot may be mounted to a passive section of the continuum arm robot.

In some embodiments one or more of the continuum arm robot segments of the continuum arm robot may differ in length or differ in tendon angles.

In some embodiments the continuum arm robot segments may taper in diameter along the length of the continuum arm robot.

In a third aspect there is provided a continuum arm robot including at least one continuum arm robot segment of the first aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Aspects and embodiments of the present disclosure will now be discussed with reference to the accompanying figures. Further aspects and embodiments will be apparent to those skilled in the art.

Figure 1:
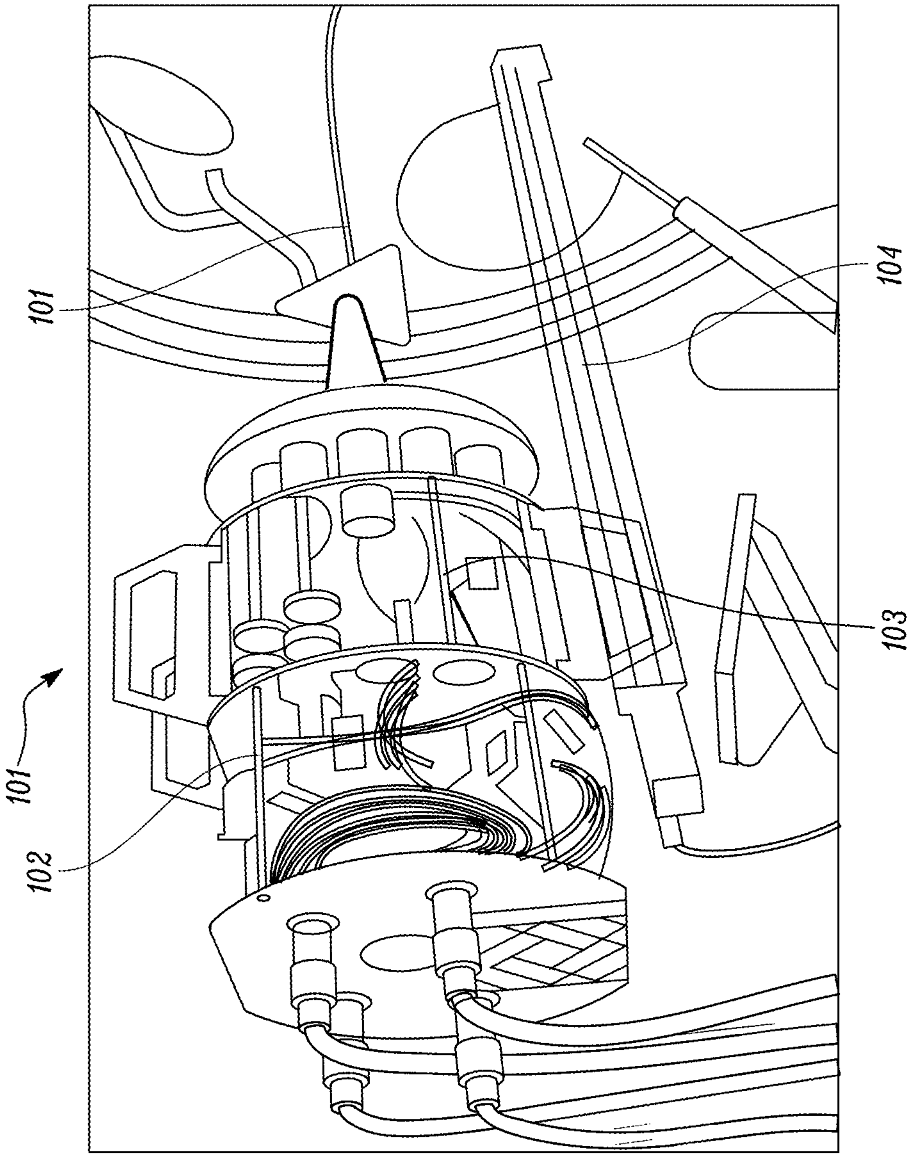
FIG. 1 presents a prior art example of a continuum arm robot.

FIG. 1 presents a prior art example of a continuum arm robot 100. The prior art continuum arm robot comprises a continuum arm robot portion 101 permanently integrated and extending out from an actuator pack 102. The actuator pack 102 contains a plurality of independent actuators 103. These actuators are used to modulate the tension within the tendons that run through the continuum arm robot portion 101. The tendons are associated with joints within the arm; each of these 10 joints or segments are designed to move in response to a tensioning or relaxing of the tendon associated with the joint or segment. This tensioning or relaxing of the tendon therefore causes a contraction or extension of the joint or segment, which allows the continuum arm robot portion 101 to bend. The actuator pack 102 is shown being positioned on a rail or support 104, which is positioned close to the component 15 to be inspected. The actuator pack 102 is also provided with a plurality of power and signal cables 105 that are used to power and address the actuators 103. The individual signals across the range of actuators 103 provide control of the joints or segments such that the continuum arm robot portion 101 can be directed. Not shown in FIG. 1 is that there is also a need for an operator with a computing device that is linked to the actuator to control movement of the continuum arm and to perform the desired task.

Due to the nature of continuum robots not being supported along their length, they deflect like a cantilever beam under loading; this can result in issues with positional control. Firstly, this leads to a deflection from the intended position along the length of the robot arm. Secondly, each of the joint sections also undergoes a degree of deflection, which can be exacerbated by loading and results in a bending in the shape of the arm.

Figure 2B:
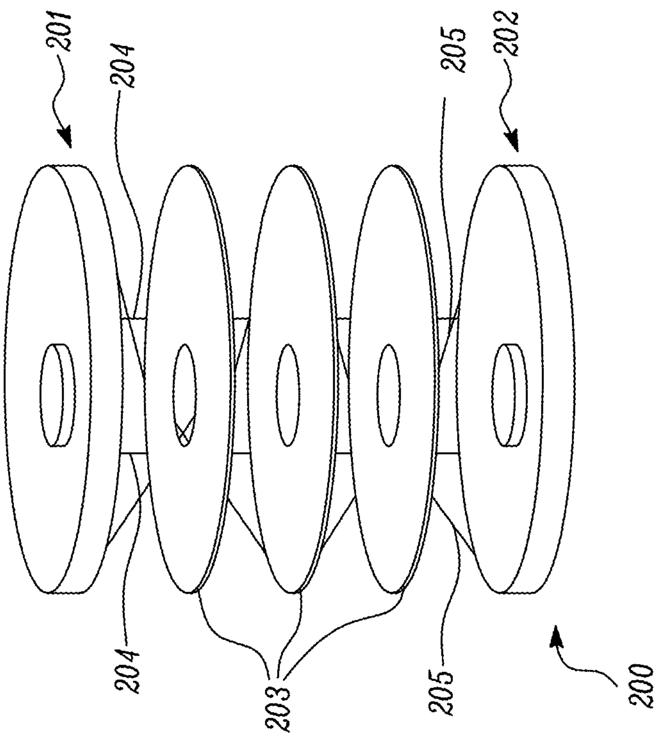
FIG. 2B PRIOR ART
FIG. 2*b* presents a continuum arm robot segment according to the present disclosure showing the routing of tendons therein.
Figure 2A:
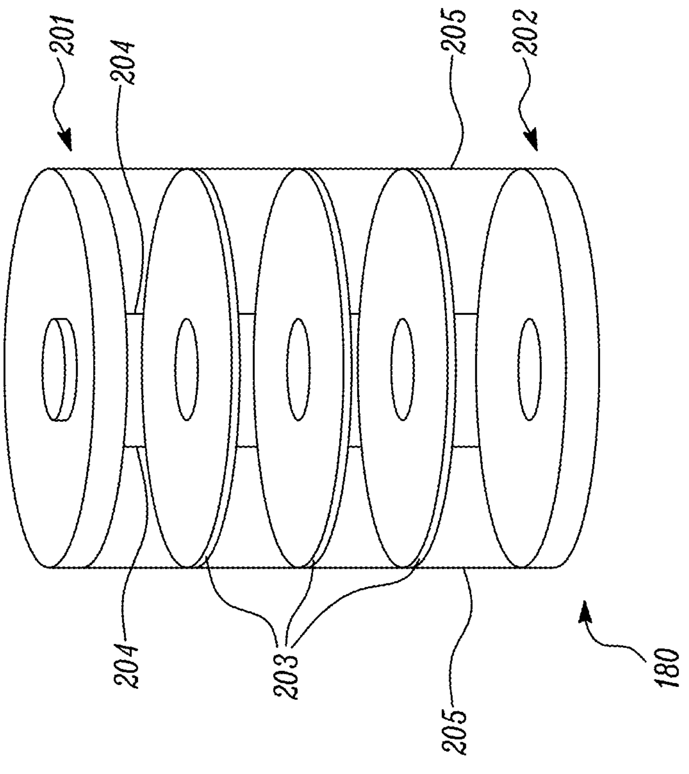
FIG. 2*a* presents an example of a prior art segment of a continuum arm robot.

FIG. 2*a* presents an example of a prior art segment of a continuum arm robot. This continuum arm robot segment 180 comprises a proximal end section 201 and a distal end section 202. Between the proximal end section 201 and the distal end section 202 are a number of vertebrae 203 that are connected via linkages 204. Tendons 205 pass from the distal end section 202 to a coupling point at the proximal end section 201 and are used to control the deformation of the continuum arm robot segment 180. The tension of the tendons 205 is controlled by actuators (not shown). These actuators are typically computer-controlled motors that are connected to a single tendon within a joint and can adjust the length of the tendon within the robot in a controlled way. Shortening the length of one of the tendons 205 causes a curve in the continuum arm robot segment. In FIG. 2*a* the tendons 205 are shown to run in straight lines along the edge of the continuum arm robot segment. Such routing of the cables is easier and allows for a shorter caballing length. The effect of this can be to limit the loading or the forces that the continuum arm robot is able to sustain at an end effector (not shown), i.e. a device at the end of continuum robot that is configured to perform a desired task. Most end effectors are mechanical or electromechanical and serve as grippers, process tools, or sensors. Continuum arm robot segments 180 are physically coupled to each other to form the backbone of a continuum arm robot; however, they have the ability to be controlled independently through the use of the actuators. Furthermore, each independent continuum arm robot segment 180 requires a set of at least two tendons 205 to allow for planar motion, or three tendons to allow for spatial motion. The tendons 205 pass parallel and in straight lines along the outside of the continuum arm robot segment 180 and go through the vertebrae to help shape the section and to ensure that a regular curvature is obtained. These tendons terminate at the end of that segment but must pass through the preceding segments. Consequently, the most distal continuum arm robot segment of the robot (i.e., the one preceding the end-effector) is thus controlled by a set of tendons that run throughout the whole backbone of the continuum arm robot. As such, these joint segments are affected by the motion of all of the previous joint segments. This is because any deformation of a preceding continuum arm robot segment will result in an increase in the length of the tendons of the distal end if it is to maintain its shape. Conversely, the most distal continuum arm robot segment (i.e., that adjacent to the actuation unit) is actuated by a set of tendons whose length is independent from all the others. However, this segment will indirectly affect any other tendon set within the arm. Therefore, intermediate tendon sets will be dependent on the configuration of more proximal sets and affect more distal ones. This makes the determination and the programming of computer programs to control the shape of the robot highly complex and inefficient in calculation. Sensors may be routed through different segments to help with the determination of shape; however, these can be similarly affected by this deformation due to effects of stretch and twist. Therefore, this coupling of the backbone of a prior art continuum robot arm significantly increases the complexity of the system. It also means that kinematics and statics cannot be solved segment by segment but always require a global solution and moving distal segments causes (and measures) the undesired motion of proximal ones. This requires greater computer power and time to calculate the position and to determine movement signals. As such this can be limiting to the performance of the robotic arm.

FIG. 2*b* presents the routing of the tendons of the robot along a continuum arm robot segment 200 according to an embodiment of the present disclosure. In this embodiment the proximal end section 201 and the distal end section 202 are linked by a number of linkages 204 that couple the vertebrae 203 with the ends of continuum arm robot segment 200. The hollow core 206 of the continuum arm robot segment allows for the passage of cables (not shown) and conduits (not shown) that may be required by an end effector (not shown) that is provided at the proximal end of the continuum arm robot. Furthermore, the tendons 205 for subsequent passages can pass through the hollow core, or along those outside of the segment with that segments' controlling tendons. Each independent continuum arm robot segment 200 requires a set of at least two tendons 205 to allow for planar motion, or three tendons to allow for spatial motion. In FIG. 2*b* it can be seen that the tendons 205 that control the movement of the continuum arm robot segment 200 are routed helically. The helical routing starts at the distal end section 202 and then radially spirals as it passes through the vertebrae 203 of the backbone before linking and terminating at the end of the proximal end section 201. The vertebrae 203 of the backbone are equally spaced, so that the radial offset of the tendon passing through each tendon is maintained constant. The constant radial offset and the even spacing between the vertebrae, as well as the vertebrae and the end segment means that the length of the tendon in each section is the same when the segment is in its straight configuration. The angular difference of where the tendon 205 passes through each vertebrae 203 can be set to any suitable value. The angular path may be dependent upon the number of vertebra 203 within a segment. By way of example for a 360° spiral over two vertebra and the two end sections the spiral will be offset by 90° at each vertebrae. Increasing the number of vertebra between the end sections would mean that the radial offset between the vertebra would be decreased. As such the angular pitch may be from 5° to 90°. In particular, the angle may be from 5° to 45°. Using a smaller angle is found to reduce friction, but increase the segment length. There may be more than one 360° rotation in the path of the tendon as it passes through a segment. Such a configuration may be beneficial if the segment has a longer length for example. Alternatively, it could be that segments are linked so as to move as one with N number of segments, and so that each segment has substantially 360°/N angular rotation of the tendon. Such a linked system will mean that the entire length of N segments can be modelled as described. For example, a two linked segment would have a rotation of the tendon of 180° within each segment. There may be any suitable number of vertebrae sections within a segment. A continuum arm robot may be formed of a number of continuum arm robot segments 200 linked together. The other continuum arm robot segments may have helical routing or parallel routing, or a combination of the two. For example, a number of the proximal continuum arm robot segments may have parallel routing whilst the distal ends may have helical routing. A continuum robot arm of the disclosure has at least one continuum arm robot segment having helical routing. The tendons for the other continuum arm robot segments may run along the outside of the continuum arm robot segment along with the control tendons for that continuum arm robot segment, or they may run through the hollow core and be paired with the continuum arm robot segment at the proximal end of the continuum arm robot segment. Alternatively, the tendons may run through the end sections and the vertebra, but are spaced apart from the drive tendons of the continuum arm robot segment. Different continuum arm robot segments may have different lengths or different numbers of vertebrae. The angular value for the tendons in different continuum arm robot segments may be different. Additionally or alternatively, if more than one continuum arm robot segment is present, the continuum arm robot segment diameter may be tapered as they progress along the arm. The spiral or helical path of the tendon as it passes though the segment will act to increase the length of the tendon cable. The tendons may be made from nitinol (nickel titanium), steel, fibre (e.g. a synthetic fibre such as DYNEEMA® polyethylene fibre from Avient Corporation or similar) or a plastics materials (e.g. nylon, ultra-high molecular weight polyethylene or similar). The tendons of a s continuum arm robot segment may be made from different materials. The end sections and the vertebrae may be made from any suitable materials. For example, they may be made from a metallic material, such as aluminium, titanium, steel, or alloys of materials. Alternatively, the end sections and vertebrae may be made from plastics materials. The end sections and the tendons may be made from different materials. As the tendons pass through a vertebrae section they pass through a slot or an aperture, the aperture may be provided with a friction reducing element. The friction reducing element may be a lubricant such as a grease or highly viscous compound. Alternatively or additionally, the friction reducing element may be a film, coating or lining. Additionally or alternatively, the slot may be designed to reduce friction such as tapered tendon slots or fillets. Suitable materials for the friction reducing element may be polyfluoroethylene (PTFE e.g. TEFLON®), nylon or other low friction polymers or materials such as graphite. Alternatively, the tendons may be lubricated to help them move through the slots or the apertures. The robot arm may be used in conjunction with position sensors such as fibre Bragg gratings to accurately determine the shape of the continuum arm as it is in use.

Figure 3:
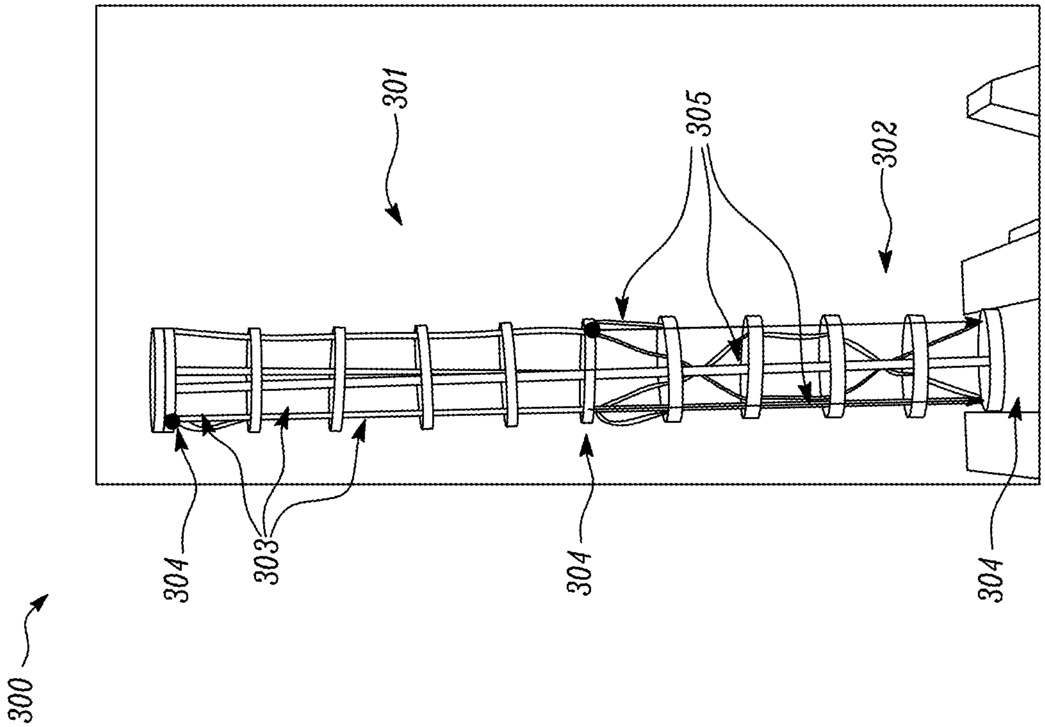
FIG. 3 presents a two-segment continuum arm robot of the present disclosure with helical routing at the proximal segment.
Figures 4A, 4B, 4C:
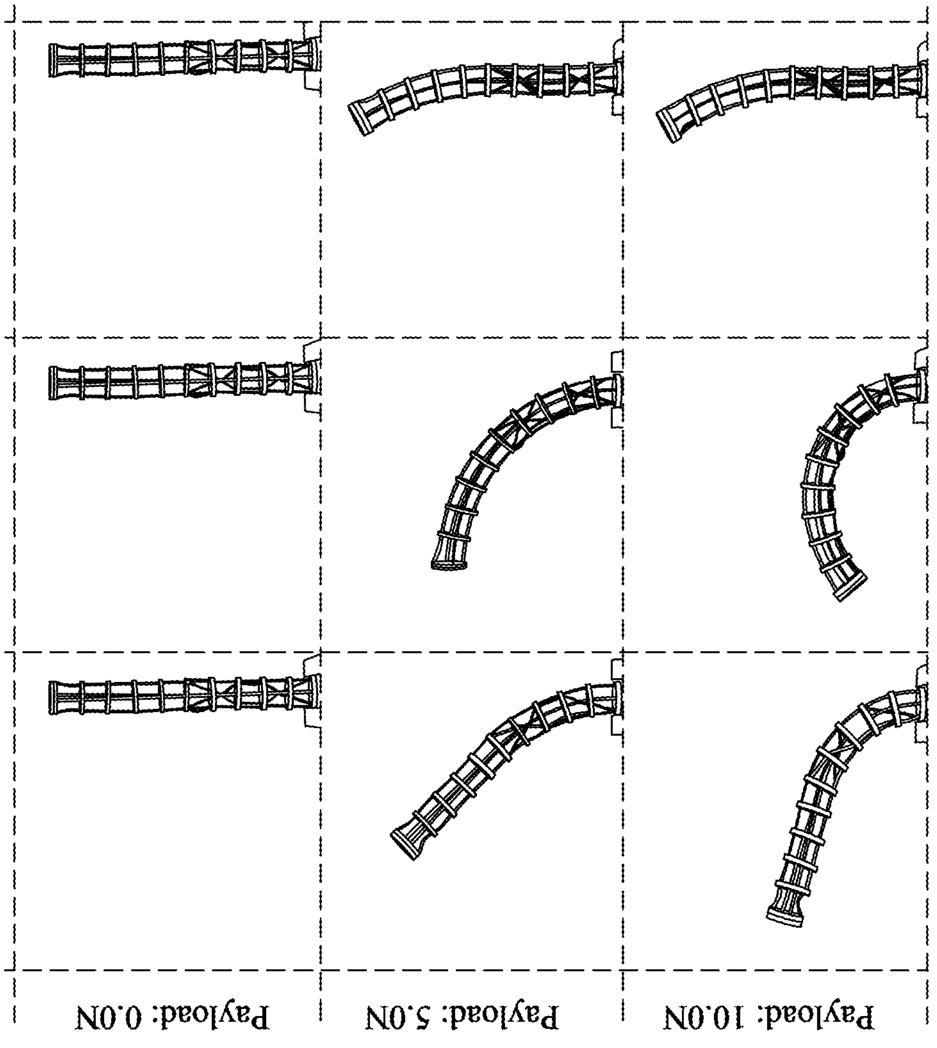
FIG. 4*a* presents example images of applying loading to a robotic arm having straight tendons at the proximal segment and helical tendons at the distal end.
FIG. 4*b* presents example images of applying loading to a robotic arm having straight tendons at the distal end and helical tendons at the proximal end.
FIG. 4*c* presents example images of applying loading to a robotic arm having helical tendon routing in both segments.

FIG. 3 presents an experimental example of a two-segment continuum robot prototype 300 with helical routing at the proximal segment 301 and to straight routing at the distal segment 302. The segments as discussed in relation to FIGS. 2*a* and 2*b* are shown to comprise a length of arm section having a flexible backbone with a number of vertebrae 303 between the segment ends 304 the vertebrae being joined to each other and to the end sections with linkages. Although this example presents a two-segment continuum arm robot a robot arm according to this disclosure may have any suitable number of segments. In the example shown in FIG. 3 an additional set of straight distal tendons has been added for characterizing the different behaviours, as illustrated in FIGS. 4*a*, 4*b* and 4*c*. As discussed in relation to FIG. 2*b* the helical routing is achieved by spiralling the tendons 305 around the body of the continuum robot, so that the point in each vertebrae section that the tendons pass through is radially offset from the previous and the subsequent joint segment. It can be seen in this case that there is a single helical spiral that passes through the segment. There are 4 vertebrae between the proximal and distal end sections, as such the radial offset in between each vertebra and end section is 60°.

FIGS. 4*a*, 4*b* and 4*c* presents example images of applying loading to robotic arms having different helical tendon configurations. The figures show the robot arm having 0 N loading, 5 N loading and 10 N from the top to the bottom of the figures respectively. In FIG. 4*a* the proximal continuum arm robot segment of the continuum robot has straight tendons, whilst the distal end has helical tendons. The figure shows that with 0 N loading the robot arm is straight. With 5 N of loading the straight tendons of the proximal end start to deflect, whilst the helical segment remains straight. When the robotic arm is loaded with 10 N it can be seen that there is a significant deflection in the straight section of the proximal end, whilst the helical tendon section at the distal end remains straight. In FIG. 4*b* the distal end has the helical tendons, whilst the proximal end has the straight tendons. It can be seen that at 0 N of loading that the robot arm represents a straight arm. At 5 N of loading the distal end remains straight, whilst the proximal end with the straight run tendons shows a distinct curve from the straight. At 10 N of loading the proximal end shows a significant deflection, whilst the distal end also shows a small degree of curvature from the normal. In FIG. 4*c* both of the continuum arm robot segments have helical tendon routing. In the case of 0 N loading the robot arm like in the examples of FIGS. 3*a* and 3*b* shows a straight robot. With 5 N of loading the distal end shows a small deflection from the straight. There is less deflection in the arm from a straight line than there is in either of the examples shown in FIGS. 4*a* and 4*b*. With 10 N of loading the deflection is more prominent than at 5 N, but both continuum arm robot segments more closely resemble a straight line than the curve of the other examples. From the images it is clear that the presence of the helical tendon routing assists in improving the strength of the robotic arm, in that it minimises deflection upon loading of the arm. Utilising such a configuration means that smaller diameter robots can be used or that the robots can be used with larger payloads or to perform tasks which require greater force.

A further advantage of utilising a helical routing for tendons is that the shape of the continuum arm robot segment is able to be mathematically modelled.

Figure 5:
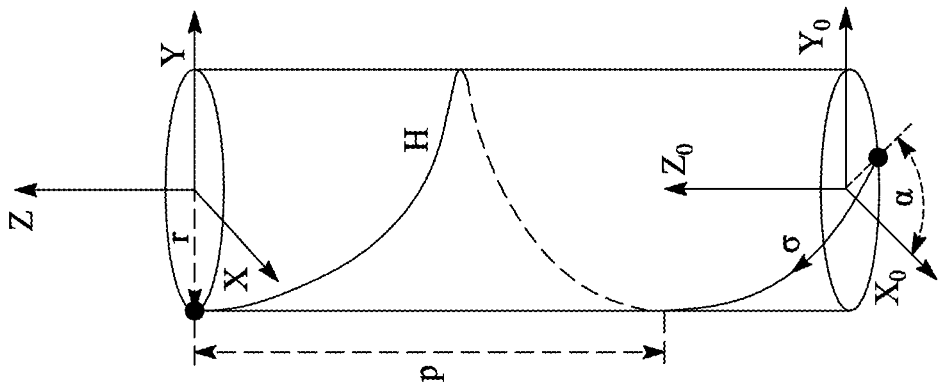
FIG. 5 presents the kinematic and modelling parameters of the centreline curve of a helical channel around the backbone.

FIG. 5 presents the kinematic and modelling parameters of the centreline curve of a helical channel around the backbone. The reason that the modelling is possible is that the helical routing creates a continuum arm robot segment configuration in which proximal segment motion does not affect the length of the tendon in the continuum arm robot segment being modelled. The helical routing provides a pitch equal to segment length, which can be demonstrated with piecewise constant curvature kinematic models. This means that the calculation of each of the continuum arm robot segments (or N linked segments) can be decoupled from each other. The main advantage of decoupling is computational; this is because it results in a reduction in the time that is required to model the robotic motion. The reason for this is that the Jacobian of the system, which is a matrix that must be inverted to solve kinematics, becomes a diagonal matrix for decoupled systems. In addition to the computational improvement, decoupling segments can provide two physical hardware advantages. Firstly, compensating for motion of the coupling of the previous segments requires a significant amount of energy, as moving the $j^{th}$ segment independently requires moving j actuator sets. This is because all of the prior segments need to adjust to compensate for the subsequent motion. Thus, by decoupling the section, the number of motor sets moving is reduced from j to 1; this potentially cuts power consumption down by a factor of j. Secondly, the actuators used by the robot can be significantly downsized. With coupled kinematics, the motors that drive the tendons terminating at the $j^{th}$ segment require a stroke of $\Delta l_{max}=jr\Delta\theta_{max}$ for a segment with radius r to achieve its full bending range of motion $\Delta\theta_{max}$. Conversely, a decoupled robot only needs a motor stroke of $\Delta l_{max}=r\Delta\theta_{max}$, allowing smaller motors and resulting in a significant improvement in actuation unit size, weight, and cost. To decouple the $j^{th}$ segment of a robot with negligible segment torsion and elongation, its actuating tendons (i.e., the ones that terminate at the end of that segment) can be routed helically for all its proximal segments and then switch to a straight routing for the $j^{th}$ segment only. By applying this routing path to the entire robot, we can obtain a fully decoupled robot.

Figure 6:
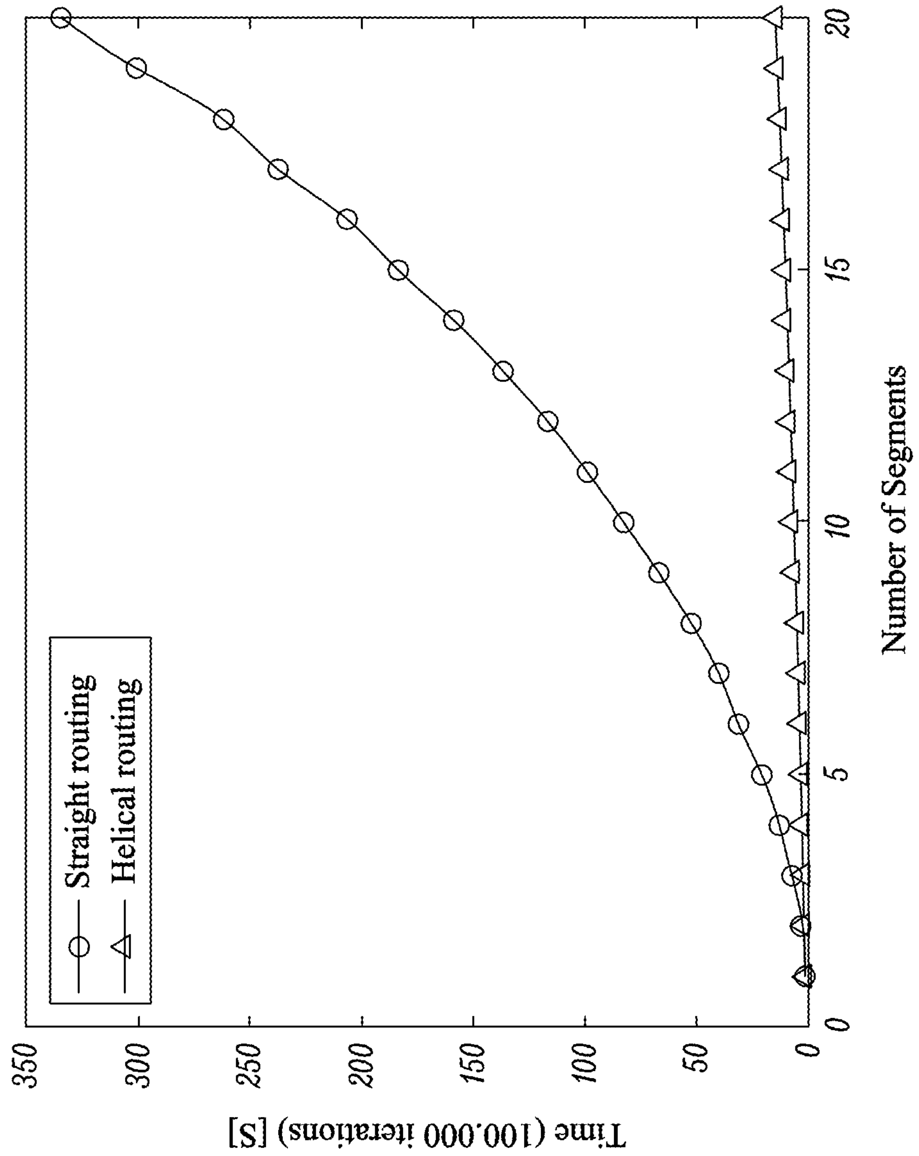
FIG. 6 presents a graph showing the total time to solution for straight and helical routing in continuum arm robots from 1 to 20 segments for 100,000 iterations.

FIG. 6 presents a graph showing the total time to solution for straight and helical routing in continuum robots from 1 to 20 segments for 100,000 iterations. In both cases as the length of the robot increases in the number of segments the total time for the calculation of 100,000 iterations increase. The difference, however, is that for the helical routing the increase is roughly linear growth going from 0-15 s between 0 and 20 segment length, whilst the straight tendons increase is a polynomial growth pattern. This means that for the $20^{th}$ segment the time taken is nearly 340 s. Thus, it can be seen that there is a significant computational benefit that is obtained by routing the tendons helically. Such reductions in calculation time can result in better and greater automated control programs for a continuum arm robot having segments as described. Furthermore, helical tendon configurations within segments of a continuum robot can significantly improve the actuation process both in terms of required stroke and power consumption, as well as in control with regards to computational weight for kinematics. The design is fully validated experimentally with a prototype, which achieved the desired behavior with a negligible error (less than 3%) and high repeatability.

Figure 7:
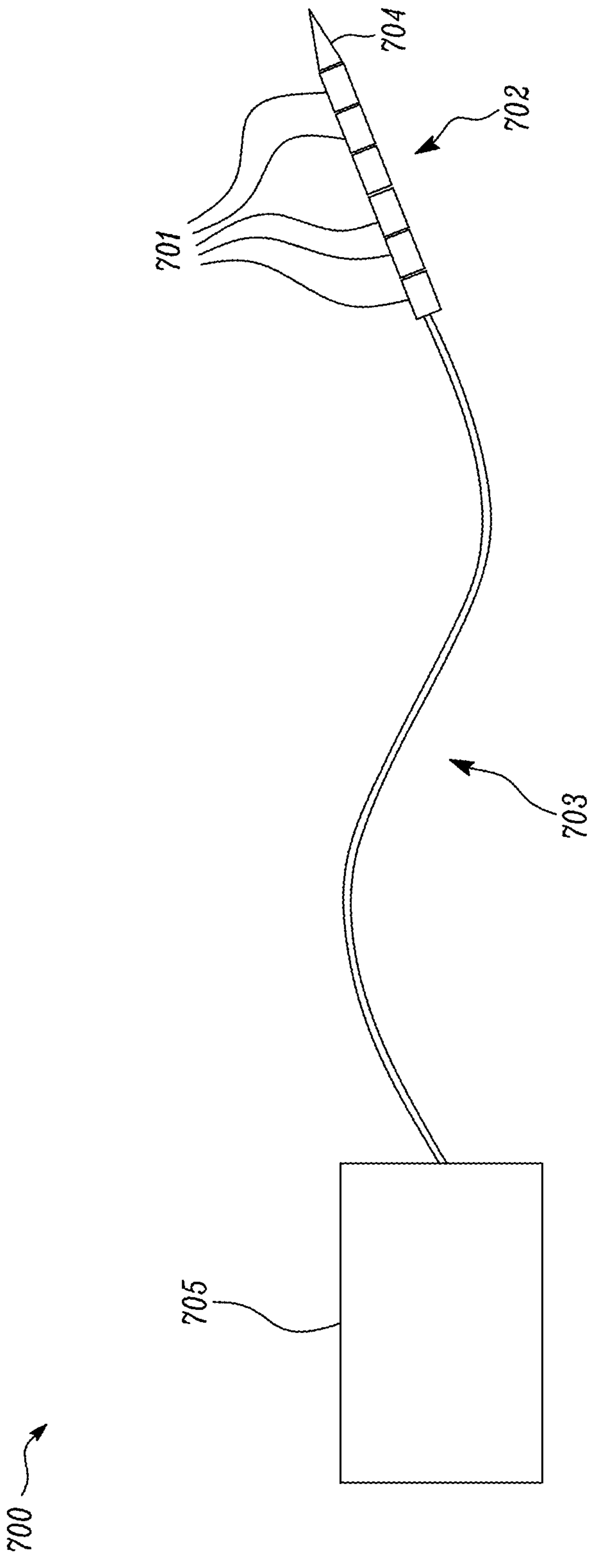
FIG. 7 presents a continuum arm robot according to the present disclosure.

FIG. 7 presents an example of a continuum arm robot 700 according to the present disclosure. In this the continuum arm robot 700 has six continuum arm robot segments 701 forming part of the active section 702 of the continuum arm robot. At least one of these active segments is a continuum arm robot segment 701 having helical routing as presented in FIG. 2*b*. The active section 702 of the continuum arm robot 700 is connected to a passive section 703, where there are no continuum arm robot segments 701. The passive section 703 has routing for all of the tendons that control the active section 702 as well as power and supplies for an end effector 704 that is mounted at the proximal end of the active section 702 of the continuum arm robot 700, i.e. the end furthest away from the passive section 703. The end effector 704 may be any suitable end effector as would be apparent to the person skilled in the art. The end effector may comprise an optical system, a mechanical system or an electromechanical system. Mounted at the opposite end of the passive section is an actuator pack 705. The actuator pack 705 contains the actuators (not shown) that are used to manipulate the tension of the tendons as well as the electronics that are required to control the actuators.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A continuum arm robot including at least one continuum arm robot segment, wherein each of the at least one continuum arm robot segments comprises a proximal end section, a distal end section, between the proximal end section and the distal end section is at least one vertebra, the vertebra being linked to the proximal end section and to the distal end section by linkages, the proximal end section, the distal end section and the at least one vertebra are configured to have hollow cores to provide a passage within the continuum arm robot segment, at least two tendons are connected to the distal end section and pass through the at least one vertebra and the proximal end section, and wherein in at least one of the continuum arm robot segments the at least two tendons are routed helically, wherein each tendon is connected to an actuator to control the tension of the tendon and wherein a linked set of N segments are linked, so that the tendons in each segment have at least a 360°/N angular rotation.

2. The continuum arm robot segment of claim 1, wherein the tendons are made from nitinol, steel, fibre or a plastics material.

3. The continuum arm robot segment of claim 1, wherein there are from 1 to 20 vertebrae between the proximal end section and the distal end section.

4. The continuum arm robot segment of claim 1, wherein the continuum arm robot segment is provided with friction reducing elements at points where the tendons pass through the at least one vertebra.

5. The continuum arm robot segment of claim 1, wherein the proximal end section and the distal end section are made from steel, titanium, aluminium, a metal alloy, or a plastics material.

6. The continuum arm robot segment of claim 1, wherein the at least one vertebra is made from steel, titanium, aluminium, a metal alloy, or a plastics material.

7. The continuum arm robot segment of claim 1, wherein an angle of the tendons as they pass through the continuum arm robot segment is from 5 degrees to 90 degrees.

8. The continuum arm robot segment of claim 7, wherein the angle of the tendons as they pass through the continuum arm robot segment is from 5 degrees to 45 degrees.

9. The continuum arm robot of claim 1, wherein there are a plurality of continuum arm robot segments each having a helical tendon routing.

10. The continuum arm robot of claim 1, wherein a proximal continuum arm robot segment within the continuum robot is provided with an end effector.

11. The continuum arm robot of claim 1, wherein a distal continuum arm robot segment of the continuum arm robot is mounted to a passive section of the continuum arm robot.

12. The continuum arm robot of claim 1, wherein one or more of the continuum arm robot segments of the continuum arm robot differ in length.

13. The continuum arm robot of claim 1, wherein the continuum arm robot segments taper in diameter along the length of the continuum arm robot.

14. The continuum arm robot segment of claim 1, wherein the at least two tendons undergo at least a 720° rotation between the proximal end section and the distal end section.

15. A continuum arm robot including at least one continuum arm robot segment, wherein each of the at least one continuum arm robot segments comprises a proximal end section, a distal end section, between the proximal end section and the distal end section is at least one vertebra, the vertebra being linked to the proximal end section and to the distal end section by linkages, the proximal end section, the distal end section and the at least one vertebra are configured to have hollow cores to provide a passage within the continuum arm robot segment, at least two tendons are connected to the distal end section and pass through the at least one vertebra and the proximal end section, and wherein in at least one of the continuum arm robot segments the at least two tendons are routed helically, so that they undergo at least a 360° rotation between the proximal end section and the distal end section, wherein each tendon is connected to an actuator to control the tension of the tendon, and wherein one or more of the continuum arm robot segments of the continuum arm robot differ in an angle of the tendons as they pass through the continuum arm robot segment.

16. The continuum arm robot segment of claim 15, wherein the tendons are made from nitinol, steel, fibre or a plastics material.

17. The continuum arm robot segment of claim 15, wherein there are from 1 to 20 vertebrae between the proximal end section and the distal end section.

18. The continuum arm robot segment of claim 15, wherein the continuum arm robot segment is provided with friction reducing elements at points where the tendons pass through the at least one vertebra.

19. The continuum arm robot segment of claim 15, wherein the proximal end section and the distal end section are made from steel, titanium, aluminium, a metal alloy, or a plastics material.

20. The continuum arm robot segment of claim 15, wherein the at least one vertebra is made from steel, titanium, aluminium, a metal alloy, or a plastics material.

* * * * *